Aug. 21, 1962  J. E. LYDLE ETAL  3,050,096
TIRE CHANGING MACHINE
Filed March 11, 1959  4 Sheets-Sheet 2
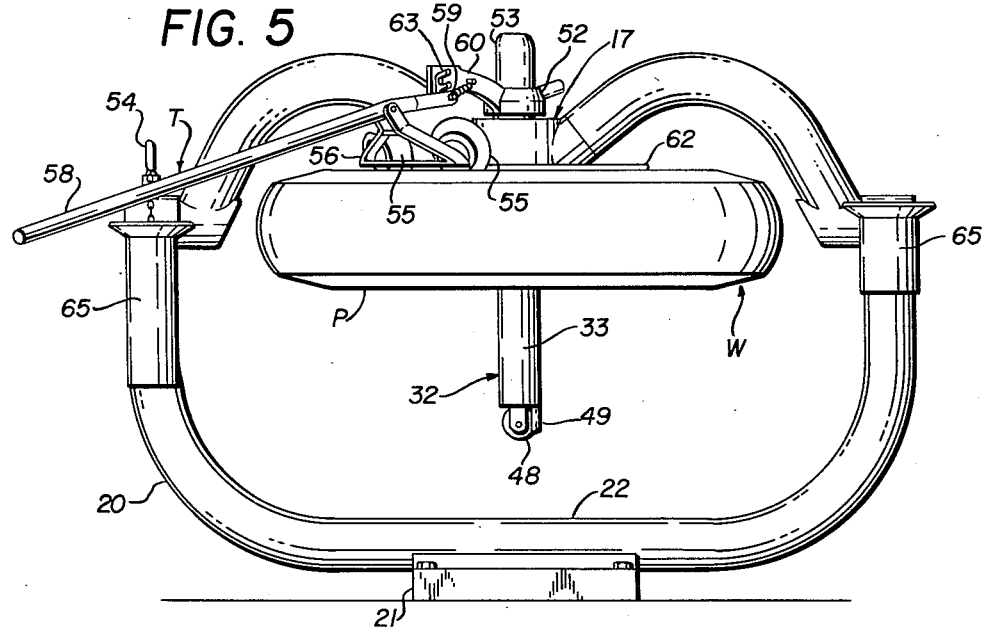
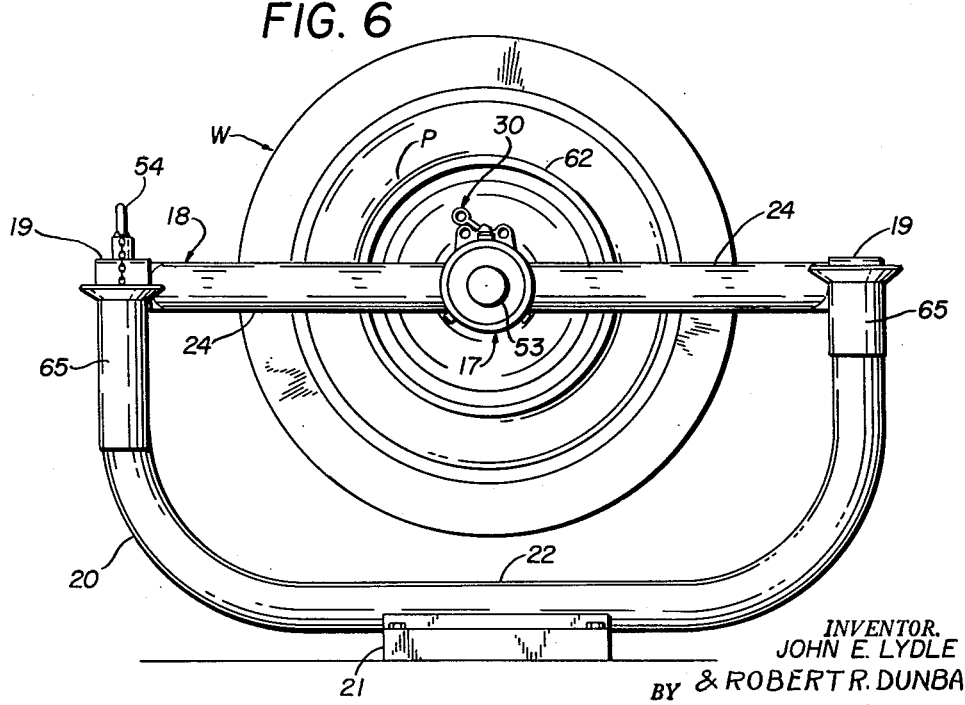
INVENTOR.
JOHN E. LYDLE
& ROBERT R. DUNBAR
BY
William Cleland
ATTORNEY Aug. 21, 1962 J. E. LYDLE ETAL 3,050,096
TIRE CHANGING MACHINE
Filed March 11, 1959 4 Sheets-Sheet 3
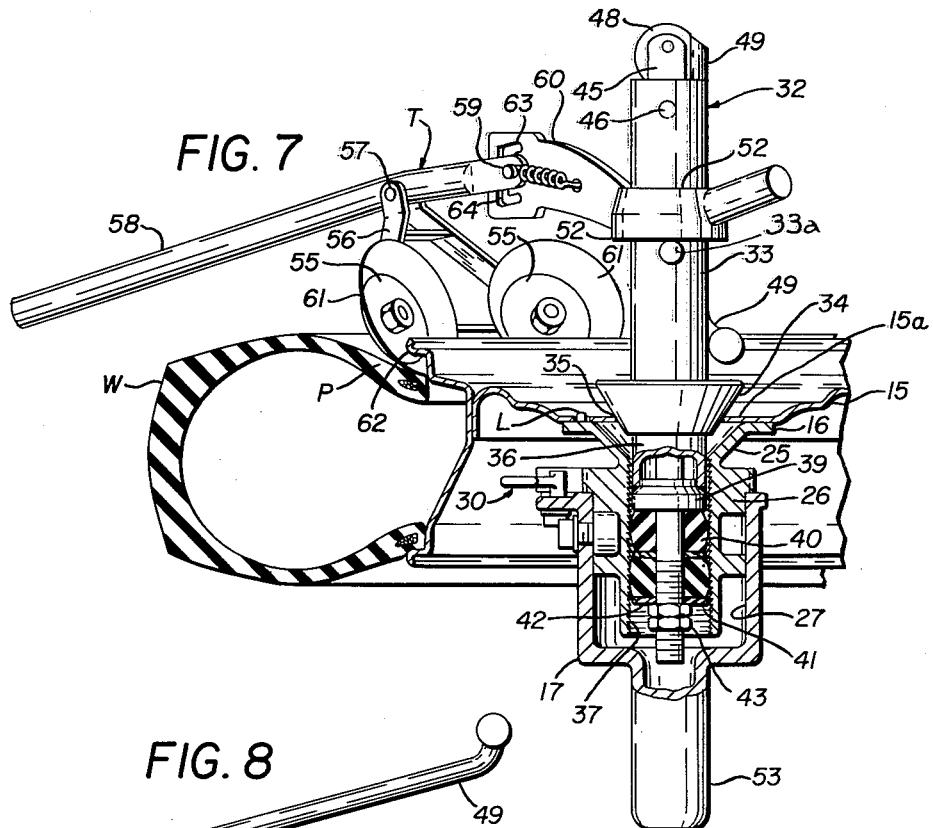
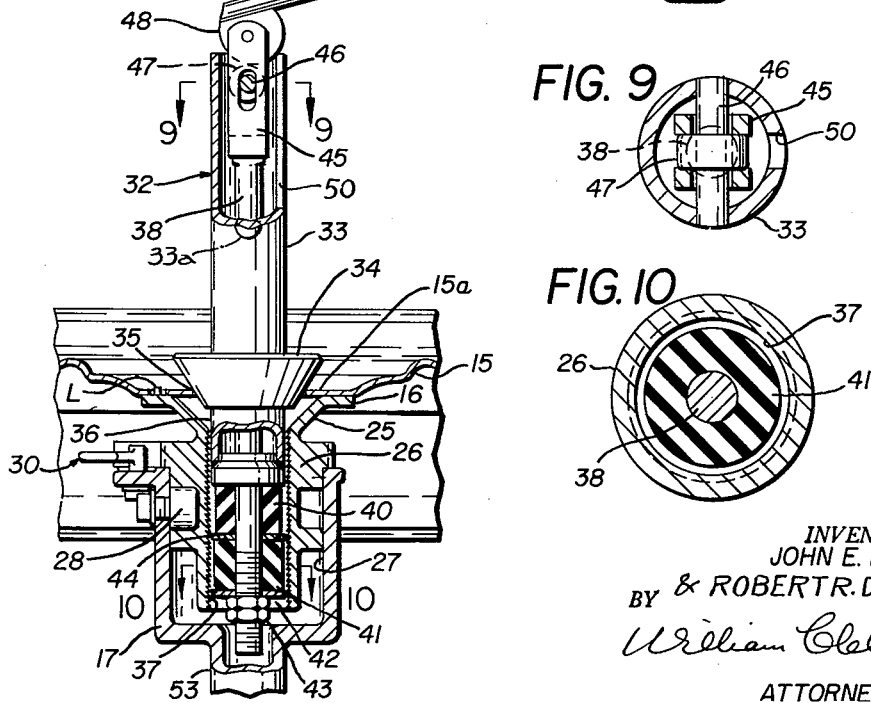
INVENTOR.
JOHN E. LYDLE
BY & ROBERT R. DUNBAR
William Cleland
ATTORNEY

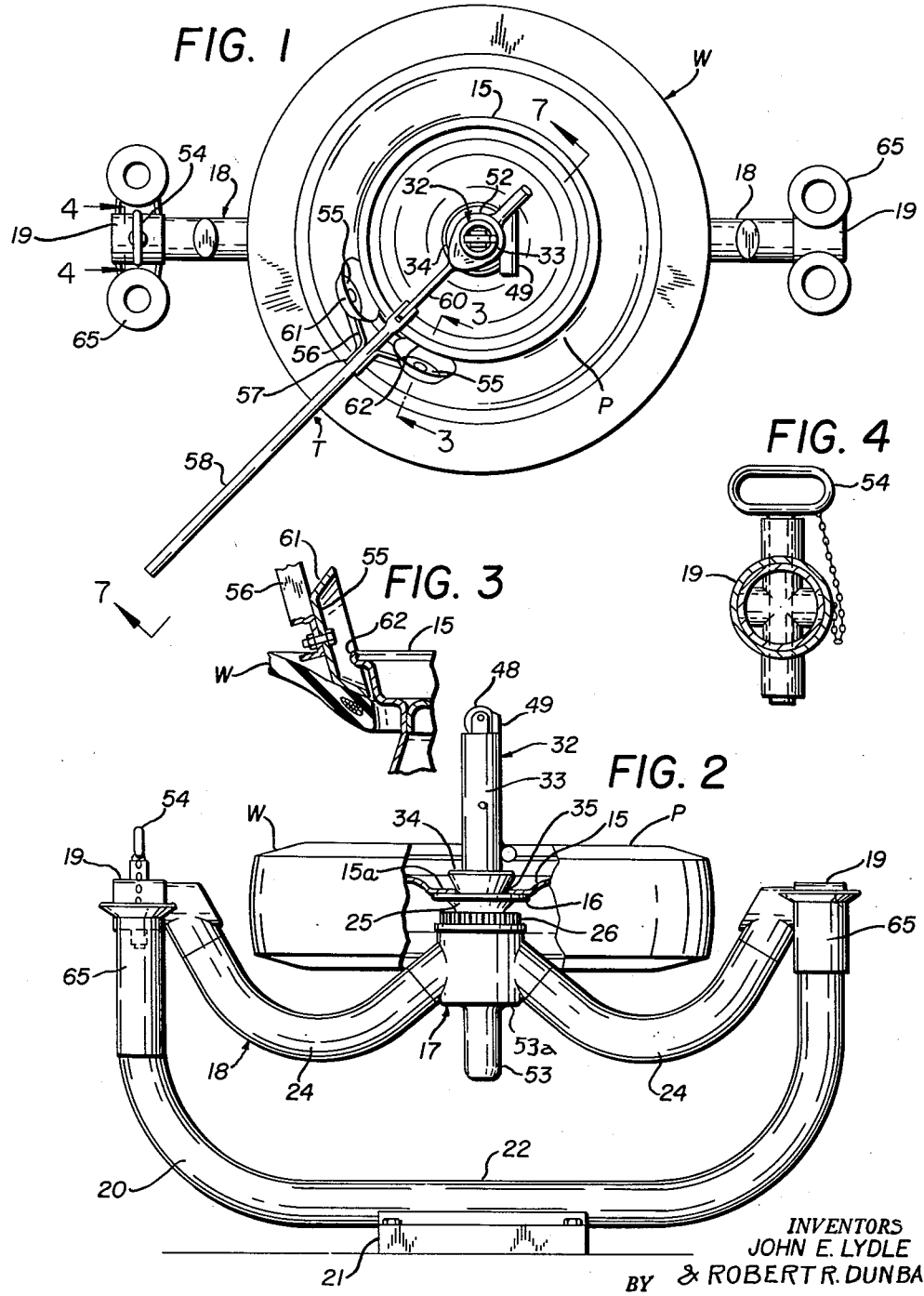

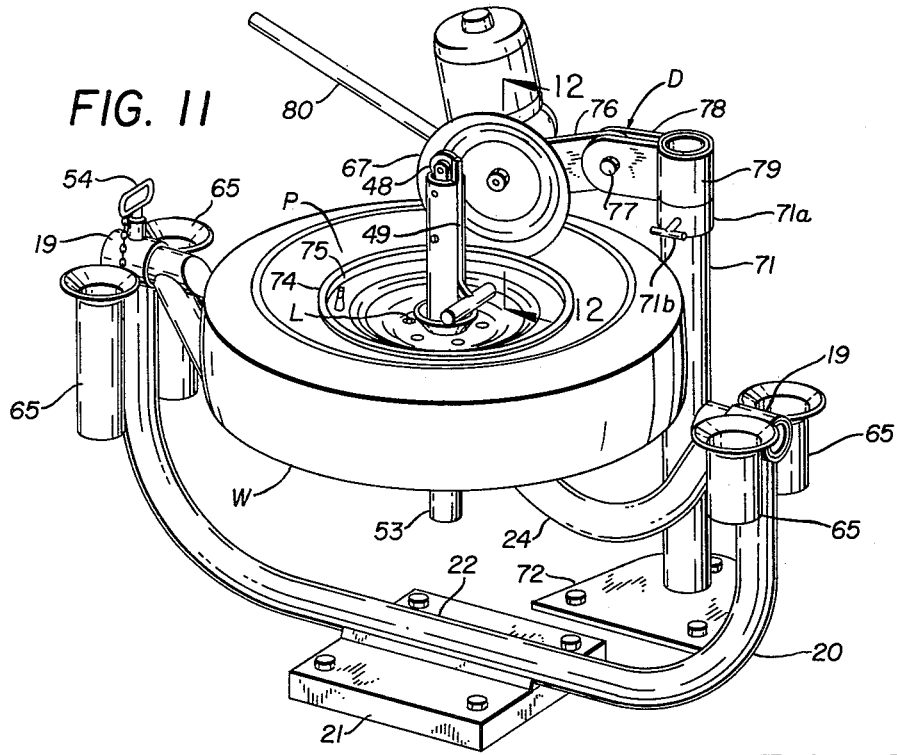
FIG. 11
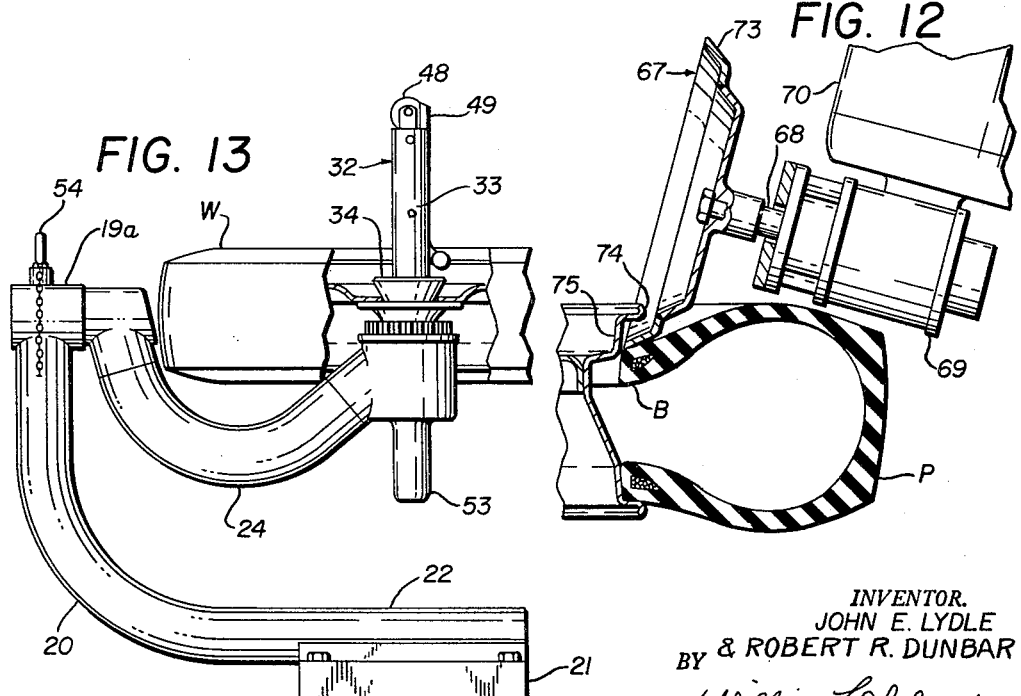
FIG. 12
FIG. 13
INVENTOR.
JOHN E. LYDLE
BY & ROBERT R. DUNBAR
William Copeland
ATTORNEY

United States Patent Office 3,050,096
Patented Aug. 21, 1962

3,050,096
TIRE CHANGING MACHINE
John E. Lydle, Akron, and Robert R. Dunbar, Massillon, Ohio, assignors, by direct and mesne assignments, to said John E. Lydle
Filed Mar. 11, 1959, Ser. No. 798,667
4 Claims. (Cl. 144—288)

This invention relates to tire changing equipment, and in particular relates to a machine for mounting and demounting pneumatic tires with respect to wheels having drop-center rims.

Tire changing machines provided in the past have been unsatisfactory for certain purposes, such as because they were cumbersome and difficult to operate, or that they were limited to use for specific operations, or they were awkward to operate or use due to obstructions, or they required too many operations for complete removal and/or remounting of the tire with respect to a wheel rim.

One object of the present invention is to provide a compact, easy to operate tire changing machine, including improved means by which a wheel, rim and tire assembly may be quickly mounted for selective easy adjustment to present either side of the assembly, or peripheral portions thereof, in substantially unobstructed relationship to an operator, as for various tire changing operations upon the assembly.

Another object of the invention is to provide a tire changing machine of the character described with means for positioning a wheel and tire assembly thereon with a minimum of manual lifting of the assembly by the operator.

Another object of the invention is to provide an improved wheel clamping and centering unit, which is quickly releasably attachable to a wheel mounting table of the machine, and which is operable by a simple continuing manual motion, first to anchor the centering unit to the table and then to urge the wheel toward fully clamped, self-centering support on the table.

Anothe object of the invention is to provide in a machine of the character described, an improved tire demounting tool which is effective progressively to release the tire beads from the bead seats of the wheel rim with a minimum of manual effort and without damaging the tire beads or the rim.

Still another object of the invention is to provide a machine of the character described with an improved power-operated tire demounting tool which is automatic progressively to rotate said assembly as the tire beads are urged from said bead seats.

Other objects of the invention will be manifest from the following brief description and the accompanying drawings:

Of the accompanying drawings:

FIGURE 1 is a top plan view of a tire changing machine embodying the features of the invention, and illustrating a wheel and tire assembly mounted in a horizontal operating position thereof.

FIGURE 2 is a front elevation of the same, partly broken away and in sections.

FIGURE 3 is a fragmentary cross-section, taken substantially along the line 3—3 in FIGURE 1, and illustrating the operation of one tire bead releasing disc of a tire demounting tool.

FIGURE 4 is a fragmentary cross-section, taken substantially on the line 4—4 of FIGURE 1, and showing a locking device for the machine.

FIGURE 5 is a view corresponding to FIGURE 2, but with the assembly and wheel mounting table in an inverted horizontal operating position.

FIGURE 6 is a view similar to FIGURES 2 and 5, but with the assembly and mounting table therefor in a vertical operating position.

FIGURE 7 is an enlarged vertical cross-section, taken substantially on the line 7—7 of FIGURE 1, to illustrate the improved anchoring means for the wheel clamping unit, as well as the operational use of the improved tire demounting tool.

FIGURE 8 is a view corresponding to a portion of FIGURE 7, to illustrate the anchoring means in released condition, for insertion or removal of the unit from the mounting table.

FIGURE 9 is a horizontal cross-section, further enlarged, taken substantially on the line 9—9 of FIGURE 8.

FIGURE 10 is a horizontal cross-section, still further enlarged, taken substantially on the line 10—10 of FIGURE 8.

FIGURE 11 is a perspective view of the machine shown in FIGURE 1, illustrating a modified form of tire demounting tool in use therewith.

FIGURE 12 is a view, corresponding to FIGURE 3, taken substantially on the line 12—12 of FIGURE 11.

FIGURE 13 is a front elevation, partly broken away, corresponding to FIGURE 2, and illustrating a modified form of tire changing machine.

Referring to FIGURES 1 to 10 in general, and FIGURES 1 to 4 in particular, it is desired for the purposes of the invention to support a tire and wheel assembly W so that the same may be rotatable about a plurality of angularly disposed axes, namely the axis of the wheel and a horizontal axis.

To this end the wheel 15 is releasably clamped, by means to be described later, onto a platform or table 16 which is rotatably mounted in a cylindrical hub 17 of a rigid cross-member 18, journalled between horizontally aligned, laterally spaced trunnions 19, 19 affixed on the upper ends of a U-shaped support 20. The support 20 may be generally of tubular metal, and is adapted to be maintained rigidly upright by a base 21 affixed to the central portion of the cross-piece 22 of the support, and bolted to a floor. Thus, the support stands affixed generally in a vertical plane, and the cross-member 18 is rotatable 360° about a horizontal axis through the trunnions 19. In the position best shown in FIGURE 2, the arms 24, 24 of the cross-member, intermediate the trunnions and the central hub 17, are downwardly arcuate to facilitate mounting the wheel assembly W on the table 16, by rolling the same from the floor onto the lowermost portions of either arm 24 and then tilting the assembly flatwise to approximate centered position on the table 16.

As best shown in FIGURES 2, 7 and 8, the table 16 constitutes an annular flange, out-turned from a conical wall 25, and which converges downwardly to a stem 26 rotatably received in a cylindrical recess 27 in hub 17. Stem 26 is retained against axial movement in the recess 27, by a disc roller 28 rotatably mounted on the hub wall to roll in an annular groove in the stem. Adjustable pawl and ratchet means 30, of known type, may be provided between hub 17 and stem 26, to permit selective locking or one-way ratcheting of the table 16 in either direction, or to be free for rotation in either direction.

For quickly releasably affixing the wheel 15 in self-centered position on table 16, there may be provided a combined wheel-clamping and tool-centering post unit 32. As best shown in FIGURES 7 to 10, the unit 32 includes a tubular post 33 having a downwardly converging conical enlargement 34 for self-centering reception in the usual hub recess 35 of a metal wheel 15. A downward extension 36 of tubular post 33 is receivable in an axially extending serrated or roughened passage 37 through the stem 26. For this purpose the serrations may be threads, for example. A rod 38 extending through the post 33 passes through a guide disc 39 affixed in the lower end of the post extension. A pair of centrally apertured cylindrical plugs 40 and 41, of solid, rubber-like resilient material, are retained between a washer 42 and guide disc 39 by nuts 43 threaded on the end of the rod, the resilient plugs being separated by a metal washer or spacer 44.

Both of the resilient plugs are slightly smaller than the threaded or serrated inner periphery of the passage 37, for easy insertion therethrough as shown in FIGURE 10 (clearance shown is somewhat exaggerated). The lowermost resilient plug 41, however, may be of slightly greater diameter than the other plug, for reasons to be explained later. The upper end of the rod terminates in a bifurcated portion 45 which is vertically slotted for reception of a fixed pin 46, extending through the post 33, said pin having a roller 47 mounted thereon between the bifurcations.

Pivoted between the bifurcations, above pin 46 may be an eccentric cam disc 48 which rides on the roller 47. Assuming that the clamping and centering post 33 has been manually urged to the relationship shown in FIGURE 8, the operator may, by means of an elongated handle 49 affixed to extend tangentially to an edge portion of the cam disc, rotate the cam disc against the relatively fixed roller 47, thereby to urge the rod 38 upwardly. Upward movement of rod 38, while the post is manually urged toward the table 16, causes the resilient plugs 40 and 41 to be compressed to increased diameter against the threaded inner periphery of the passage 37. The larger lowermost plug 41, however, will grip the passage wall first to anchor the lower end of the rod against further upward movement, so that continued rotation of the cam disc 48 is effective, through pressure on the roller 47 and pin 46 to urge the post 33 downwardly to full clamping pressure of the conical enlargement 34 with the wheel hub 15a, thereby to assure holding the latter non-rotatably clamped against the platform or flange 16. The post is slotted at 50 in axial direction, to receive the handle 49 flush with the outer periphery thereof, as shown in FIGURE 7, whereby the post is free and unobstructed in the clamped condition in FIGURE 7, for rotatable reception of a collar 52 of a tire-changing tool T, against a stop pin 33a.

For use of the tool T at the other side of the wheel assembly W, as in the inverted position of the same and cross-member 18 in FIGURE 5, the hub 17 may have an integral cylindrical shank 53 extending in axially opposite direction to the post 33. The collar 52 of tool T is adapted to be rotatably received on shank 53, against a stop seat 53a. Cross-member 18 may be locked in various positions of rotation on the trunnions 19, for convenient positioning of the wheel assembly W, as best shown in FIGURES 2, 5 and 6, for example. Accordingly, as best shown in FIGURE 4, a suitable pin 54 is adjustable in various combinations of aligned openings (FIGURE 4) in one trunnion 19 and the journalled end of the corresponding arm 24, for locking the cross-member in such positions.

The tool T, shown in FIGURES 1, 3 and 7, is a tire demounting tool, including spaced tire-engaging "disc" rollers 55, 55, pivoted on a rigid generally triangular hanger 56 having spaced ears 57, 57 on the upper part thereof pivotally embracing an elongated lever bar 58, which is adjustably pivoted at 59 on a radial arm 60 rigidly extending from the collar 52 (see FIGURES 1 and 7). Each disc roller 55 is cup-shaped, with a frusto-conical wall 61 flaring outwardly of the pivotal support on the lower portion of the hanger, and in direction toward the usual rim flange 62 of the wheel 15, the wheel rim being of known drop-center type. Thus, the lever 58 is downwardly operable on pivot 59, to urge the disc rollers downwardly against the bead portion of the tire P, the flaring walls 61 of the rollers being engageable to requisite extent under the rim flange 62 (see FIGURE 3). Accordingly, with continued downward pressure on the lever 58, simultaneously with movement thereof to rotate the collar 52 on post 33 (or shank 53 as the case may be) the rollers 55 will progressively urge or "break" the bead portion B of the tire axially inwardly of the rim flange and peripherally around the bead, as shown in FIGURES 3 and 7. Adjustment of the pivot 59 axially of the wheel assemblies to accommodate wheels and tires of different sizes, may be accomplished by selective spring-urged reception of pivot pin 59 into one or other of a plurality of axially spaced recesses or slots 63, 63, which are connected by an axially extending slot 64 for yielding passage of the pin from one recess 63 to another (see FIGURE 7).

Cylindrical containers 65, 65 are conveniently affixed on the trunnions 19, for storage or support of tools or tool parts when not in use.

In operation of the machine described above, as for demounting a tubeless pneumatic tire P from wheel 15, the machine will be in the condition shown in FIGURES 1 and 2, but with the wheel assembly W and the centering post unit 32 removed. That is, the cross-member will be locked by pin 54 with rotatable table 16 in upwardly presented horizontal position (see FIGURES 1 to 3).

Now, the operator may roll the wheel and tire assembly W on the floor, up onto the lowermost curvate portion of one arm 24 of cross-member 18. From this position it is relatively easy for the operator to flop the assembly over to be supported in substantially centered position on the table 15. A locating pin L affixed on the table 16, received through a hole provided in the wheel hub, prevents rotation of the wheel relatively of the table (see FIGURE 7).

Next, the operator positions the post unit 32 as shown in FIGURE 8, as previously described, to clamp the wheel 15 firmly against the table, by swinging the cam arm 49 to the retracted position thereof shown in FIGURE 7. This locks the post unit in anchored position, by expansion of the rubber blocks 40 and 41 against the serrated passage 37 of stem 26, and the machine is in condition for work on the wheel assembly.

For removing tire P from wheel 15, for example, the demounting tool T may be rotatably anchored on the post 33, as shown in FIGURES 1 and 7, by reception of the upwardly presented post 33 through collar 52, and engaging the spaced conical walls 51 of disc rollers 55 downwardly against the bead portions of the tire P with the peripheral edge portions of the discs contacting the lip of the wheel rim flange 62, substantially as illustrated in FIGURES 1, 3 and 7. The pivot pin 59 is adjusted to suit for desired angular engagement with the tire sidewall, and the ratcheting device 30 is set according to whether the operator is right or left handed. If the operator is right handed the ratcheting device 30 is set to prevent rotation of the table 16 in clockwise direction, so that by pressing downwardly on lever arm 58, while simultaneously urging the handle in clockwise direction, the disc rollers 55 will urge or break the tire bead away from the bead seat and flange 62 (see FIGURE 3). Upon repeatedly turning the wheel assembly and table on the hub 17, about a quarter of a revolution in counter-clockwise direction, while similarly urging the handle 58 in the same direction, the bead-breaking operation may be advanced completely around the wheel. This entire operation may be repeated in the locked inverted position of the cross-member 18 shown in FIGURE 5, for breaking the opposite tire bead from the wheel rim seat, in which event the demounting tool collar 52 is rotated on the stem 53 of relatively fixed hub 17. When both beads have been thus loosened from the bead seats, the wheel assembly is removed from the machine, after removing the demounting tool T, and raising the cam arm 49, as shown in FIGURE 8, for removal of the post unit 32. The tire P may then be removed from the wheel 15 in known manner, as for the purpose of repairing the same.

Conversely, the machine may be similarly adjusted and operated for seating the tire beads in the bead seats of wheel 15. In such instance, however, a bead seating tool is used, utilizing the post 33 and stem 53 for pivoting or fulcruming a lever or bar, in the manner of bead-seating tools shown and described in co-pending U.S. application Serial No. 668,970, filed July 1, 1957, for example. When the tire has been suitably positioned in the wheel rim seats, the beads may be urged into fully seated positions by means of a bead expanding tool of the type shown in Patent No. 2,765,841, while the cross-member 18 is locked with the wheel assembly in a convenient vertical plane, as shown in FIGURE 6.

Referring now to FIGURES 11 and 12, there is illustrated a modified form of tire demounting tool D in conjunction with the machine shown and described above in connection with FIGURES 1 to 10. Like parts, therefore, are designated by like numerals, unless otherwise indicated.

The tool D includes a disc 67 keyed on a driven shaft 68 extending from a gear reduction unit 69 of an electric motor unit 70, adjustably supported on an upright 71 affixed on a base 72, which may be separate from the base 21, or it may be an extension of the same. The rotating disc, which may be somewhat greater in diameter than the rollers 55 as shown, has a frusto-conical wall 73 adapted to wedge or engage downwardly between the wheel rim flange 74 and the tire bead B, progressively to break the bead away from the rim seat 75, in a manner to be described later.

For adjustably supporting the motor unit 70 the same may be affixed on an arm 76 pivoted at 77 between spaced lugs 78, 78, on a tubular member 79, which is rotatable on the upper end of the upright 71 and supported on a collar 71a. Collar 71a is vertically adjustable on the post by suitable locking means indicated at 71b. With the motor running to drive the disc at suitable speed such as 60 r.p.m., the operator, by means of a lever extension 80 or arm 76, may swing the arm 76 inwardly and downwardly to position the disc against the bead portion B of tire P, as shown in FIGURE 11. The operator, by continuing to press downwardly on lever 80 engages the lower portion of the frusto-conical disc wall 73 between the rim flange 74 and the tire bead portion B, whereby the rotating roller, through yielding engagement with the tire bead portion, imparts steady rotation to the table 16. This results in progressive inward removal of the tire bead B from the annular bead seat 75 (see FIG. 12), completely around the same, in a relatively short period of time and with a minimum of manual effort. By first inverting the tire as shown in FIGURE 5, and adjusting the collar 71a downwardly, this process may be repeated for breaking the opposite bead from its rim seat 75.

FIGURE 13 illustrates a modified form of machine, which is in all respects like the machine described above in connection with FIGURES 1 to 10, except that it is made heavier, and that the table supporting member is journalled in a trunnion 19a at one side only. The purpose of this structure is to minimize the amount of floor space required for installation of the machine, and to leave a tire horizontally positioned therein, for example, free and unobstructed substantially completely around the same. In FIGURE 13 parts which correspond to the structures of FIGURES 1 to 10 are indicated by like numbers, unless otherwise noted.

Other modifications of the invention may be resorted to without departing from the spirit thereof or the scope of the appended claims.

What is claimed is:

1. A machine as for changing a tire assembled on a wheel rim and use of a tool having an apertured portion for mounting said tool, said machine comprising supporting means and a fixed upright; an arm mounted on said upright to extend freely therefrom and to rotate about a horizontal axis; means selectively operable to lock said arm in various positions of rotation thereof about said horizontal axis to present the wheel assembly in a selected one of a plurality of planes including opposite horizontal positions in which at least a major portion of the tire and wheel assembly is substantially free and unobstructed at both sides axially thereof; a hub affixed on the free end of said arm and having axially opposite ends; a table mounted on one axial end of said hub to rotate on an axis substantially at right angles to said horizontal axis, and including means within said hub for retaining said table against axial movement; and releasable means for securing the wheel rim in centered relation on said table to rotate therewith on said hub; said releasable means having a first tool-receiving, substantially cylindrical stem extending freely axially of said table; said hub having affixed on its other axial end a second substantially cylindrical tool-receiving stem to extend freely therefrom in direction opposite to that of said first tool-receiving stem, said stems being proportioned for interchangeable rotational and axially slidable reception of the apertured portion of the tire changing tool.

2. A tire changing machine as set forth in claim 1, including selectively operable ratchet means between said hub and said table for selective one-way ratcheting of the table with respect to said hub.

3. A tire changing machine as set forth in claim 1, said arm intermediate said upright and said hub being arcuately offset in one direction away from said horizontal axis, whereby when the arm is in a locked position presenting the arcuate offset thereof toward the supporting means, the tire and wheel assembly is adapted to be rolled onto the concave side of the arcuate offset for mounting the assembly on said table.

4. A machine as for changing a tire assembled on a wheel rim and use of a tool having an apertured portion for mounting said tool, said machine comprising a support having fixed upright means; arm means mounted on said upright means to extend freely therefrom and to rotate about a horizontal axis; means selectively operable to lock said arm means in various positions of rotation thereof about said horizontal axis to present the wheel assembly in a selected one of a plurality of planes including opposite horizontal positions in which at least a major portion of the tire and wheel assembly is substantially free and unobstructed at both sides axially thereof; a hub affixed on the free end of said arm means and having axially opposite ends; a table mounted on one axial end of said hub to rotate on an axis substantially at right angles to said horizontal axis, and including means within said hub for retaining said table against axial movement; and releasable means for securing the wheel rim in centered relation on said table to rotate therewith on said hub; said releasable means having a first tool-receiving, substantially cylindrical stem extending freely axially of said table; said hub having affixed on its other axial end a second substantially cylindrical tool-receiving stem to extend freely therefrom in direction opposite to that of said first tool-receiving stem, said stems being proportioned for interchangeable rotational and axially slidable reception of the apertured portion of the tire changing tool.

References Cited in the file of this patent

UNITED STATES PATENTS

| | | |
|---|---|---|
| 776,013 | Decow et al. | Nov. 29, 1904 |
| 1,341,727 | Weaver | June 1, 1920 |
| 1,398,227 | Fine | Nov. 29, 1921 |
| 1,416,094 | Krauska | May 16, 1922 |
| 1,538,875 | Stevens | May 19, 1925 |
| 1,550,651 | Charter | Aug. 18, 1925 |
| 1,720,615 | Welch | July 9, 1929 |
| 2,146,417 | Catalano | Feb. 7, 1939 |
| 2,201,982 | Bazarek | May 28, 1940 |

(Other references on following page)

UNITED STATES PATENTS

| | | |
|---|---|---|
| 2,213,535 | Seip | Sept. 3, 1940 |
| 2,294,047 | Pollack | Aug. 25, 1942 |
| 2,349,552 | Holmes | May 23, 1944 |
| 2,546,849 | Branick | Mar. 27, 1951 |
| 2,746,528 | Damman | May 22, 1956 |
| 2,767,781 | Lewis et al. | Oct. 23, 1956 |
| 2,808,860 | Hildebrant | Oct. 8, 1957 |
| 2,818,095 | Stahl et al. | Dec. 31, 1957 |
| 2,825,395 | Twiford | Mar. 4, 1958 |